(12) United States Patent
Dublan Sanchez et al.

(10) Patent No.: US 11,541,812 B2
(45) Date of Patent: Jan. 3, 2023

(54) RETENTION ASSEMBLY FOR A WINDSHIELD BRACKET

(71) Applicant: Ford Global Technologies, LLC, Dearborn, MI (US)

(72) Inventors: Fabrizio Dublan Sanchez, Cuautitlán Izcalli (MX); Layla Kimberly Martinez Rivero, Azcapotzalco (MX); Ligia Olivares Espinosa, Atizapan de Zaragoza (MX); Mauro Rodriguez Rodriguez, Veracruz (MX); Diego Sebastián García Hernández, Gustavo A. Madero (MX)

(73) Assignee: Ford Global Technologies, LLC, Dearborn, MI (US)

( * ) Notice: Subject to any disclaimer, the term of this patent is extended or adjusted under 35 U.S.C. 154(b) by 181 days.

(21) Appl. No.: 17/179,535

(22) Filed: Feb. 19, 2021

(65) Prior Publication Data

US 2022/0266750 A1 Aug. 25, 2022

(51) Int. Cl.
| | |
|---|---|
| *B60R 1/04* | (2006.01) |
| *B60J 1/20* | (2006.01) |
| *B60J 1/02* | (2006.01) |
| *B60R 16/03* | (2006.01) |

(52) U.S. Cl.
CPC . *B60R 1/04* (2013.01); *B60J 1/02* (2013.01); *B60J 1/20* (2013.01); *B60R 16/03* (2013.01)

(58) Field of Classification Search
CPC ... B60R 1/04; B60R 13/0212; B60R 13/0206; B29C 65/58

USPC ............ 296/1.11, 96.21, 214, 97.9; 359/871; 248/475.1

See application file for complete search history.

(56) References Cited

U.S. PATENT DOCUMENTS

| | | | |
|---|---|---|---|
| 4,874,908 A | 10/1989 | Johansson | |
| 4,902,068 A | 2/1990 | Dowd et al. | |
| 8,845,003 B2 | 9/2014 | Still et al. | |
| 9,090,213 B2* | 7/2015 | Lawlor | B60R 11/04 |
| 9,669,770 B1* | 6/2017 | Schlaupitz | F16B 21/073 |
| 10,232,780 B1* | 3/2019 | Francus | B60R 1/04 |
| 2003/0179473 A1* | 9/2003 | Krug | B60R 1/04 |
| | | | 359/838 |
| 2010/0033857 A1* | 2/2010 | Filipiak | B60R 1/04 |
| | | | 359/872 |
| 2018/0257566 A1* | 9/2018 | Hamlin | B60R 1/04 |
| 2018/0345865 A1* | 12/2018 | Maxwell | B60R 1/12 |
| 2020/0083886 A1* | 3/2020 | Vemulapati | H03K 17/955 |

FOREIGN PATENT DOCUMENTS

EP 1219481 B1 8/2006

* cited by examiner

*Primary Examiner* — Jason S Morrow
*Assistant Examiner* — Wenwei Zhuo
(74) *Attorney, Agent, or Firm* — Vichit Chea; Price Heneveld LLP

(57) ABSTRACT

A retention assembly for a windshield bracket includes a fastening feature that includes a shaft defining a plurality of radial fins along a length of the shaft. A cover portion is operably coupled to the shaft of the fastening feature and includes an attachment feature. A coupling member includes a first clip that is operably coupled to the attachment feature of the cover portion and a second clip that is configured to receive a wire of said windshield bracket.

17 Claims, 10 Drawing Sheets

RETENTION ASSEMBLY FOR A WINDSHIELD BRACKET

FIELD OF THE DISCLOSURE

The present disclosure generally relates to a windshield bracket for a vehicle. More specifically, the present disclosure generally relates to a retention assembly for a windshield bracket.

BACKGROUND OF THE DISCLOSURE

A mirror is typically used so the user can view objects behind the vehicle. The mirror is typically attached to the windshield of the vehicle. Mirrors can have electrical wires that can provide power to the mirror.

SUMMARY OF THE DISCLOSURE

According to a first aspect of the present disclosure, a vehicle includes a windshield bracket that defines an aperture. Electrical components are operably coupled to the windshield bracket. The electrical components include wires that extend from each electrical component. A rearview mirror is proximate to the windshield bracket and is operably coupled to the electrical components via the wires. A retention assembly is operably coupled to the windshield bracket and at least one of the wires of the electrical components. The retention assembly includes a fastening feature that is disposed within the aperture that is defined by the windshield bracket and a coupling member that is rotatably coupled to the fastening feature.

Embodiments of the first aspect of the disclosure can include any one or a combination of the following features:
- the fastening feature includes a shaft and a plurality of radial fins;
- the plurality of radial fins operably couple the shaft of the fastening feature to the windshield bracket;
- the fastening feature includes an attachment feature, wherein the coupling member is operably and rotatably coupled to the attachment feature;
- the coupling member includes a first clip and a second clip;
- the first clip is operably coupled to the fastening feature and the second clip is operably coupled to at least one of the wires of the electrical components; and/or
- the fastening feature includes a cover portion that is disposed over the aperture defined by the windshield bracket, wherein the cover portion extends circumferentially from the shaft of the fastening feature.

According to a second aspect of the present disclosure, a windshield bracket assembly for a vehicle includes a windshield bracket that defines an aperture. Electrical components are operably coupled to the windshield bracket and include a wire. A rearview mirror is proximate to the windshield bracket and is operably coupled to the electrical components via the wire. A retention assembly is disposed within the aperture of the windshield bracket and is operably coupled to the wire of the electrical components.

Embodiments of the second aspect of the disclosure can include any one or a combination of the following features:
- the retention assembly includes a fastening feature and a coupling member;
- the wire is disposed within the coupling member, wherein the coupling member is rotatably coupled to the fastening feature and is configured to rotate relative to the positioning of the wire;
- the coupling member is selectively coupled to the wire and is configured to retain the wire relative to the rearview mirror;
- the retention assembly includes a shaft that is disposed within the aperture of the windshield bracket to operably couple the retention assembly to the windshield bracket;
- the shaft includes a plurality of radial fins that is configured to engage an inner wall of the aperture;
- the coupling member includes a first clip and a second clip, wherein the wire of the electrical component is selectively coupled to the second clip; and/or
- the first clip is rotatably coupled to the fastening feature.

According to a third aspect of the present disclosure, a retention assembly for a windshield bracket includes a fastening feature that includes a shaft defining a plurality of radial fins along a length of the shaft. A cover portion is operably coupled to the shaft of the fastening feature and includes an attachment feature. A coupling member includes a first clip that is operably coupled to the attachment feature of the cover portion and a second clip that is configured to receive a wire of said windshield bracket.

Embodiments of the third aspect of the disclosure can include any one or a combination of the following features:
- the second clip has a circumference that is greater than a circumference of the first clip;
- the cover portion extends circumferentially around the shaft;
- each radial fin of the plurality of radial fins has a first end and a second end; and/or
- each radial fin tapers from the first end to the second end.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the presently disclosed device will be set forth in the detailed description which follows and will be apparent to those skilled in the art from the description, or recognized by practicing the device as described in the following description, together with the claims and appended drawings.

Figure 1:
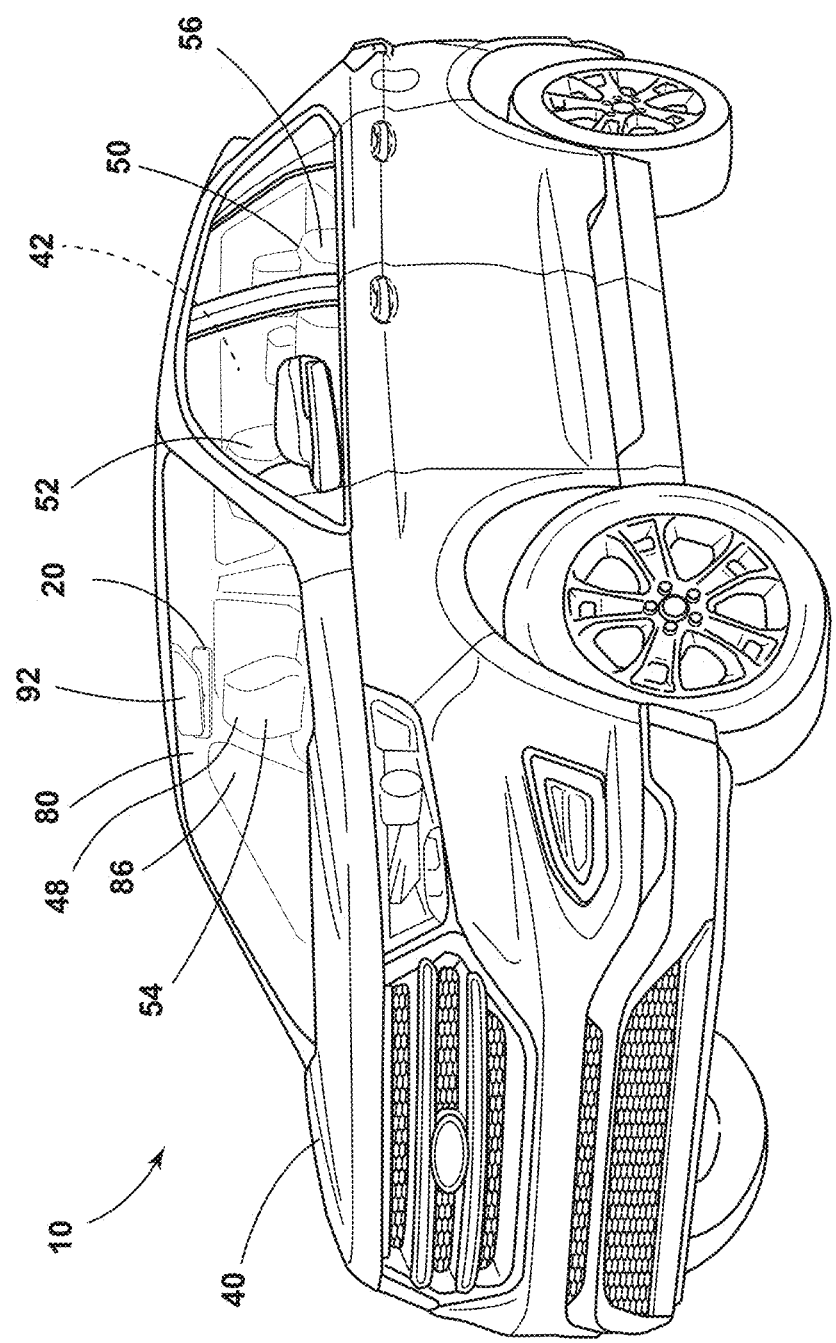
FIG. 1 is a front perspective view of a vehicle of the present disclosure.
Figure 2:
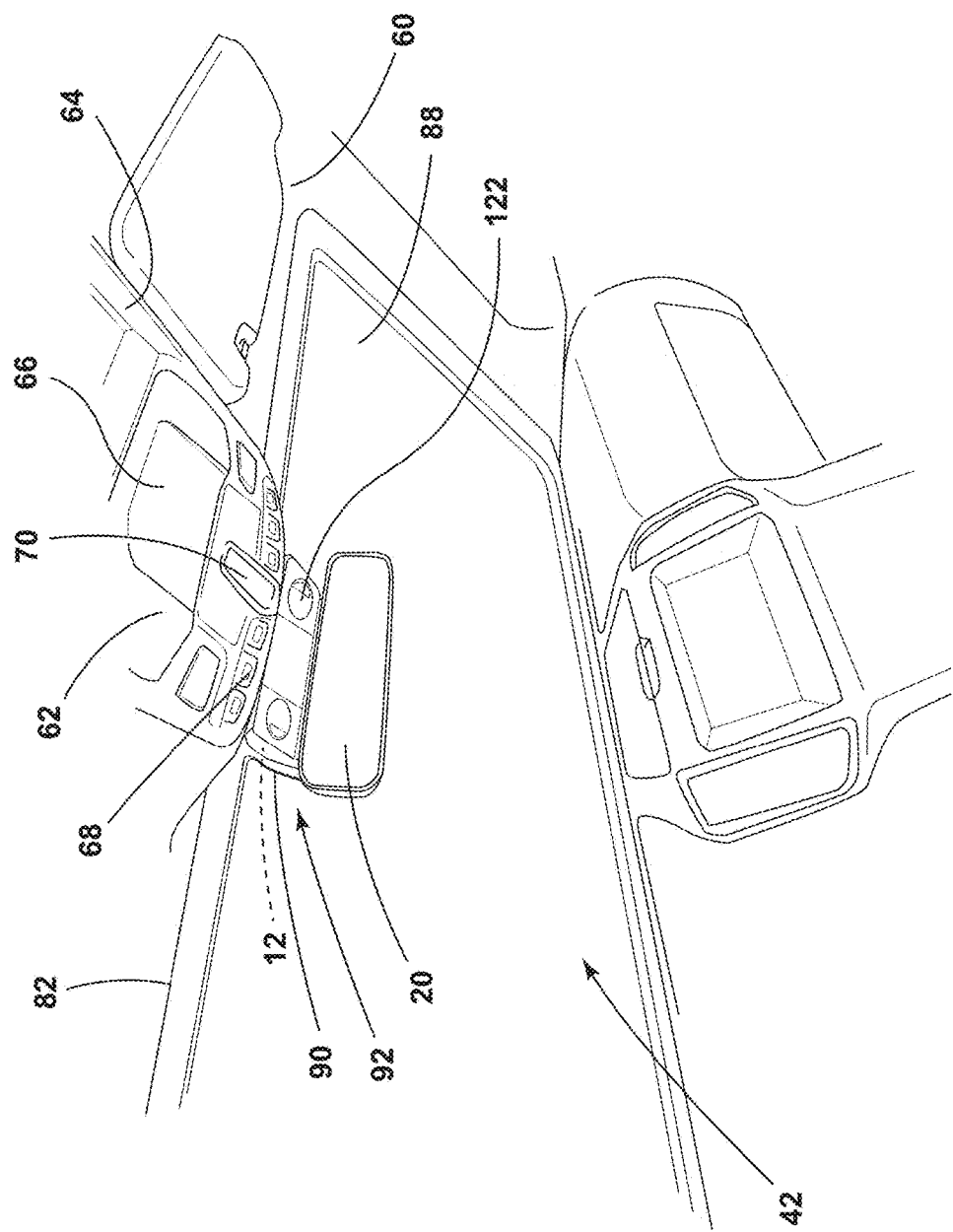
FIG. 2 is a partial side perspective view of an interior of the vehicle of FIG. 1 with a windshield bracket assembly.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-10, reference number 10 generally refers to a vehicle that includes a windshield bracket 12 that defines an aperture 14. Electrical components 16 are operably coupled to the windshield bracket 12 and include wires 18 extending from each electrical component 16. A rearview mirror 20 is proximate to the windshield bracket 12 and is operably coupled to the electrical components 16 via the wires 18 extending from each electrical component 16. A retention assembly 22 is operably coupled to the windshield bracket 12 and at least one of the wires 18 of the electrical components 16. The retention assembly 22 includes a fastening feature 24 disposed within the aperture 14 defined by the windshield bracket 12. The retention assembly 22 also includes a coupling member 26 rotatably coupled to the fastening feature 24.

Referring to FIGS. 1-4, the vehicle 10 includes a vehicle body 40 that defines an interior 42 of the vehicle 10. The interior 42 may include a first seating row 48 and a second seating row 50. Fewer or more seating rows may be included in the vehicle 10, without departing from the teachings herein. The first seating row 48 may include a driver seat 52 and a passenger seat 54, and the second seating row 50 may include rear passenger seats 56. The rear passenger seats 56 of the second seating row 50 may include bucket seating or may be bench seating. In one example, a headliner 60 may include an overhead console 62, wherein the headliner 60 is formed from a polyurethane or foam material. Additionally or alternatively, the overhead console 62 may be coupled to a ceiling 64 of the vehicle 10 above the driver and passenger seats 52, 54. The ceiling 64 may further define the interior 42 of the vehicle 10, in which the overhead console 62 may be positioned.

By way of example, and not limitation, the overhead console 62 may include a storage compartment 66, a plurality of buttons 68, and controls 70. The overhead console 62 may be embedded in the ceiling 64, such that the overhead console 62 appears integrally formed with the ceiling 64. The ceiling 64 and the overhead console 62 are generally rigid with select depressible or movable portions, such as the buttons 68, storage compartment 66, and controls 70. For example, to access the storage compartment 66, an occupant may press upon the storage compartment 66 to release the storage compartment 66 from a stowed position.

With further reference to FIGS. 1-4, a windshield 80 is operably coupled to a frame 82 coupled to the vehicle body 40. The windshield 80 has an interior surface 86 and an exterior surface 88. The frame 82 is disposed around and coupled to the windshield 80, such that at least a portion of the interior surface 86 of the windshield 80 is operably coupled to the frame 82. The windshield bracket 12 can also be operably coupled to the frame 82 at an attachment portion 90 of the frame 82. A windshield bracket assembly 92 is operably coupled to the attachment portion 90. The windshield bracket assembly 92 includes the windshield bracket 12, the electrical components 16, and the retention assembly 22, as described in more detail below. It is generally contemplated that the windshield bracket assembly 92 is positioned proximate to the overhead console 62. The windshield bracket 12 may be a separate feature from the overhead console 62. Additionally or alternatively, it is contemplated that the windshield bracket 12 may be operably coupled to and/or extend from the overhead console 62. The windshield bracket 12 is generally disposed around and proximate to the rearview mirror 20. As illustrated, the rearview mirror 20 is operably coupled to the frame 82, and the windshield bracket 12 is disposed around a retention arm 94 of the rearview mirror 20. It is also contemplated that the rearview mirror 20 can be operably coupled to the windshield bracket 12.

It is generally contemplated that the rearview mirror 20 may be electrically operated, such that the rearview mirror 20 can be operably coupled to the electrical components 16. The rearview mirror 20 may also be coupled to a printed circuit board (PCB) 96. The wires 18 of the electrical components 16 may be coupled to the PCB 96 to translate data between the PCB 96 and the electrical components 16. For example, the rearview mirror 20 may be configured to display various forms of data including, but not limited to, directional information, which can be communicated between the PCB 96, the electrical components 16, and the rearview mirror 20.

The rearview mirror 20 may also be configured to dim or lighten depending on light that can be sensed by a sensor 98 operably coupled to the rearview mirror 20. The rearview mirror 20 can be operably coupled to a controller 100 configured to receive information from the electrical components 16 via the wires 18. The controller 100 is also operably coupled to the PCB 96 to execute commands. It is also contemplated that the electrical components 16 are operably coupled to the windshield bracket 12 and may be communicatively coupled to electrical components of the overhead console 62. For example, the electrical components 16 may be in electrical communication with the overhead console 62 via at least one of the wires 18. It is generally contemplated that the overhead console 62 may provide electrical power for the electrical components 16, either directly or indirectly.

Figure 3:
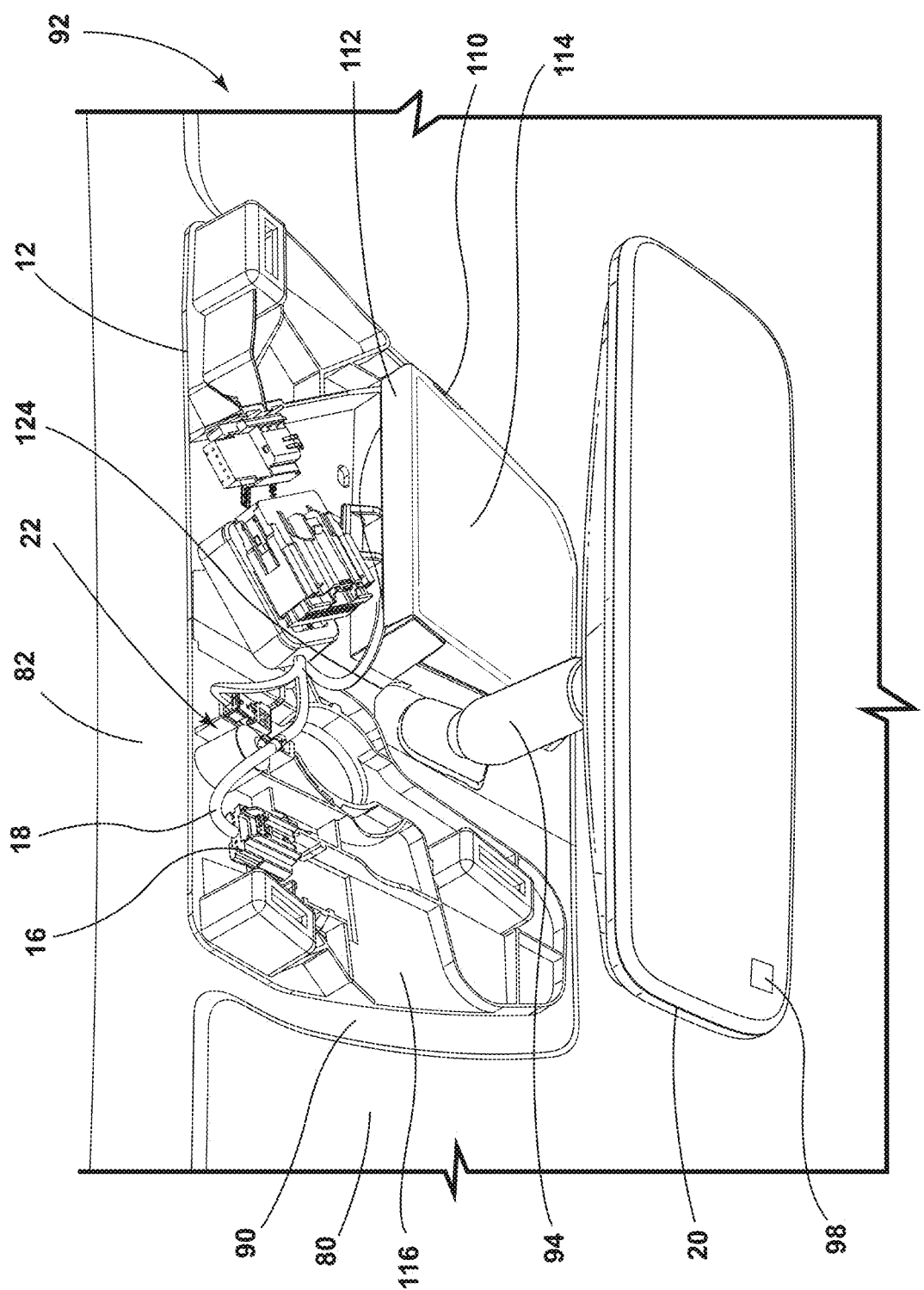
FIG. 3 is an enlarged partial side perspective view of a windshield bracket assembly and a rearview mirror of the present disclosure.
Figure 4:
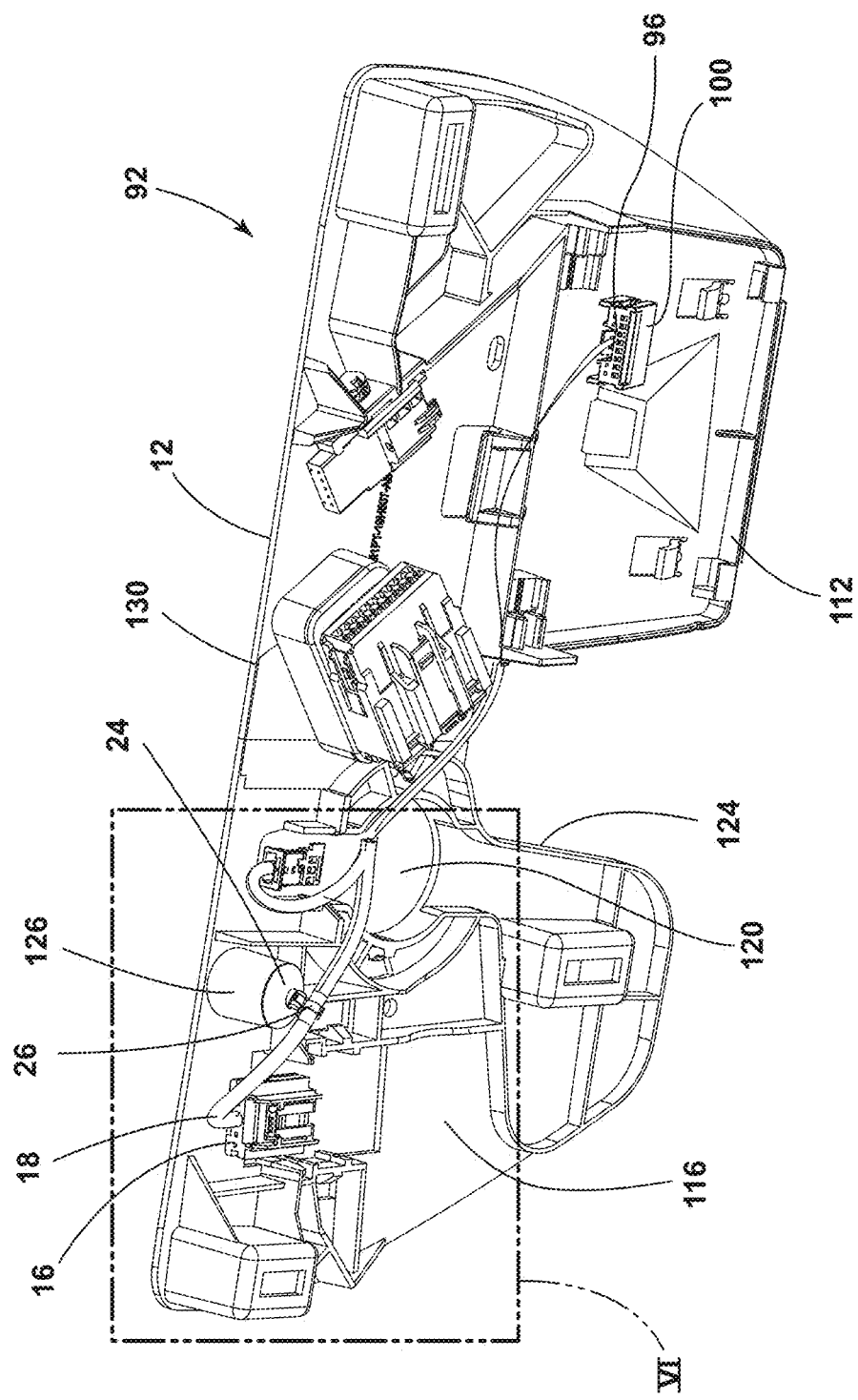
FIG. 4 is a side perspective view of a first side of a windshield bracket of the present disclosure.
Figure 5:
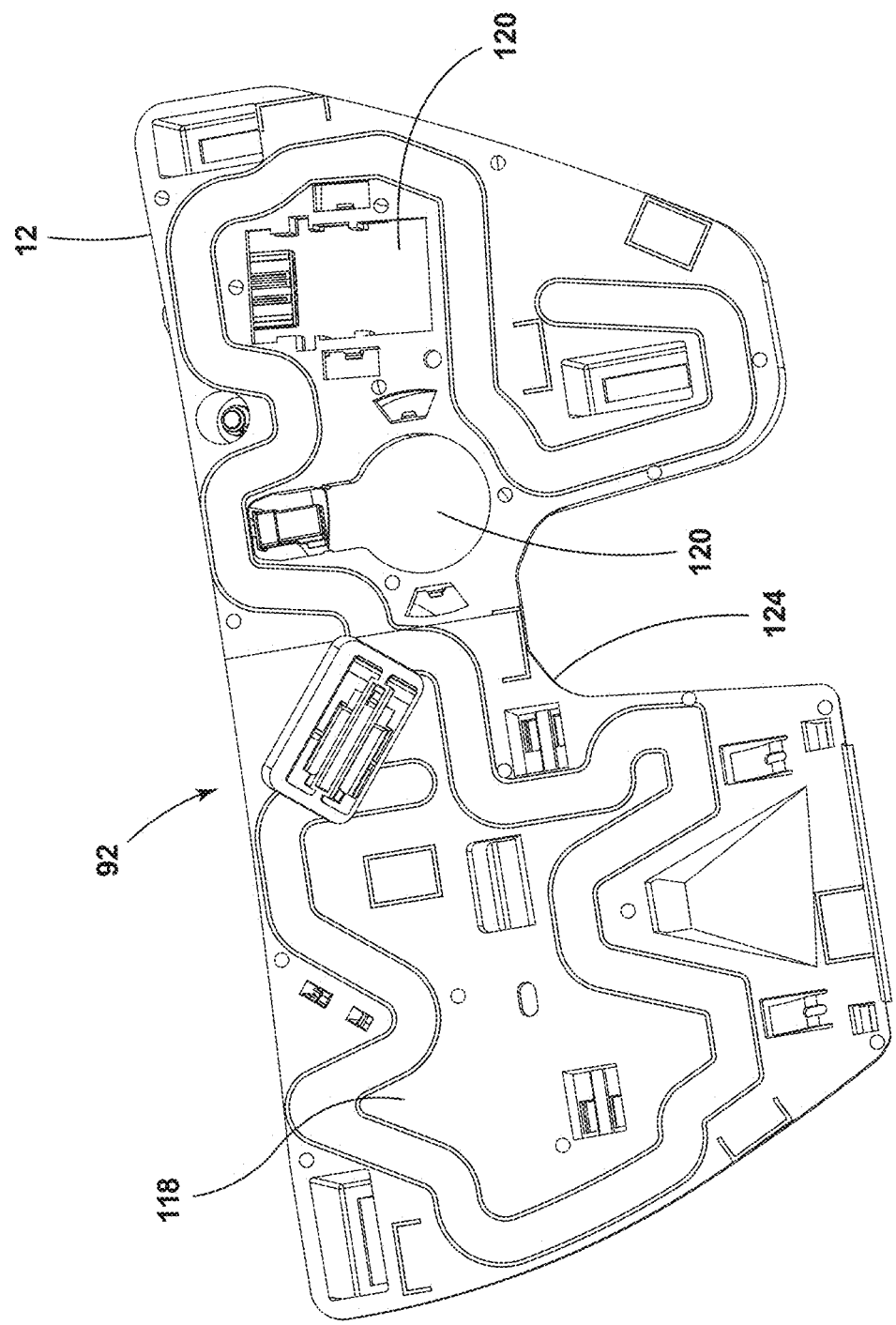
FIG. 5 is a side perspective view of a second side of the windshield bracket of FIG. 4.

Referring to FIGS. 3-5, the windshield bracket 12 can include a housing 110 that includes perimeter walls 112 and a cover 114, such that some of the electrical components 16 can be disposed and concealed within the housing 110. The PCB 96 and the controller 100 may be disposed within the housing 110. The electrical components 16 are communicatively coupled to the controller 100 via the wires 18. It is generally contemplated that the housing 110 may be disposed proximate to the windshield 80 and is integrally formed with the windshield bracket 12. While some of the electrical components 16 are disposed within the housing 110, it is also contemplated that the electrical components 16 may be disposed along the windshield bracket 12.

The windshield bracket 12 has a first side 116 and a second side 118. It is generally contemplated that the second side 118 of the windshield bracket 12 is coupled to the frame 82, and the first side 116 is directed toward the interior 42 (FIG. 1) of the vehicle 10. The windshield bracket 12 defines a plurality of openings 120 through which fasteners may extend to couple the windshield bracket 12 to the frame 82. The plurality of openings 120 may also accommodate other features that can be coupled to the windshield bracket 12.

For example, a lighting feature 122 (FIG. 2) may be coupled to the windshield bracket 12 and may be coupled to at least one of the electrical components 16. The windshield bracket 12 is also illustrated as defining a notch 124 in which the rearview mirror 20 is disposed. As mentioned above, the rearview mirror 20 may be operably coupled to the electrical components 16 of the windshield bracket assembly 92 via the wires 18. It is contemplated that the wires 18 extending between the electrical components 16 generally extend across the windshield bracket 12. The first side 116 of the windshield bracket 12 also includes a peg 126 that defines the aperture 14, mentioned above.

Referring to FIGS. 6-8B, the peg 126 also defines a cavity 128, in addition to defining the aperture 14. The aperture 14 defined by the peg 126 generally provides access to the cavity 128. The cavity 128 generally extends between the first and second sides 116, 118 of the windshield bracket 12, such that the cavity 128 can be generally closed off when the windshield bracket 12 is coupled to the frame 82. Stated differently, the frame 82 seals the cavity 128 when the windshield bracket assembly 92 is coupled to the frame 82. The peg 126 extends outwardly from the first side 116 of the windshield bracket 12 proximate to an upper edge 130 of the windshield bracket 12. Additionally or alternatively, the windshield bracket 12 may include a plurality of pegs 126 along the first side 116 of the windshield bracket 12. It is generally contemplated that the retention assembly 22, described further below, is operably coupled to the windshield bracket 12 via the peg 126 and/or the plurality of pegs 126.

Figure 6:
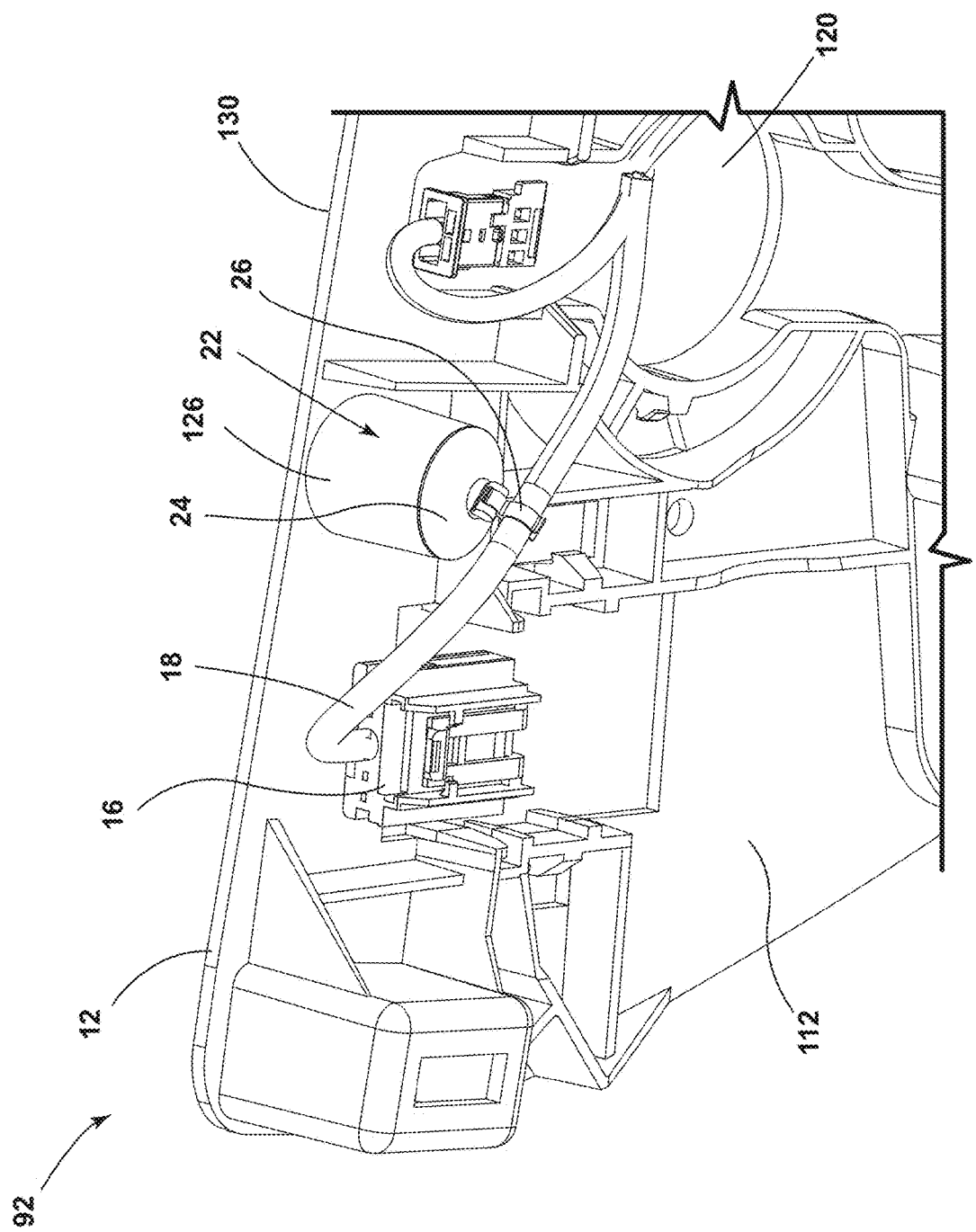
FIG. 6 is an enlarged partial side perspective view of a retention assembly and the windshield bracket taken at area VI of FIG. 4.

The retention assembly 22 is illustrated as being disposed within the peg 126. As mentioned above, the retention assembly 22 includes the fastening feature 24 and the coupling member 26. As illustrated in FIG. 6, at least a portion of the fastening feature 24 is disposed within the aperture 14 and the cavity 128 of the peg 126, and the coupling member 26 is operably coupled to the fastening feature 24. The fastening feature 24 includes a cover portion 140, a shaft 142, and a plurality of radial fins 144 coupled along a length L of the shaft 142. The cover portion 140 can generally cover an upper rim 146 of the peg 126. Stated differently, the cover portion 140 is disposed over and conceals the aperture 14 defined by the peg 126.

Figure 7:
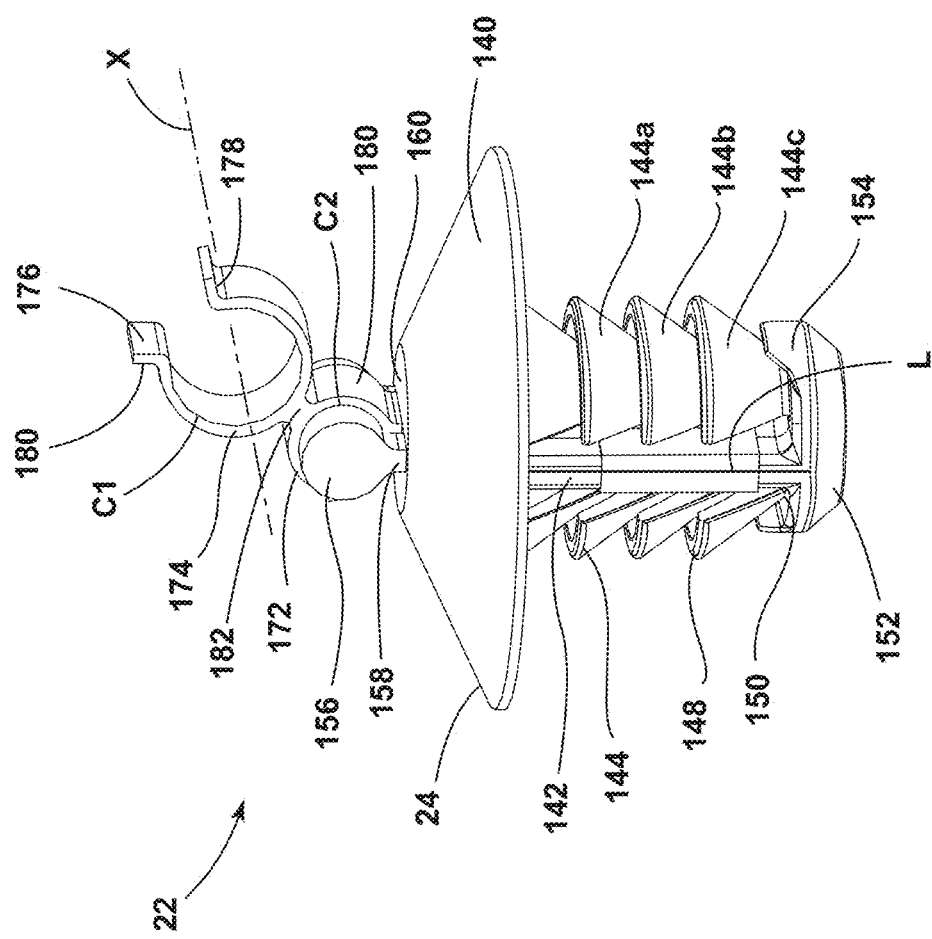
FIG. 7 is a side perspective view of a retention assembly of the present disclosure with a fastening feature and a coupling member.
Figure 8B:
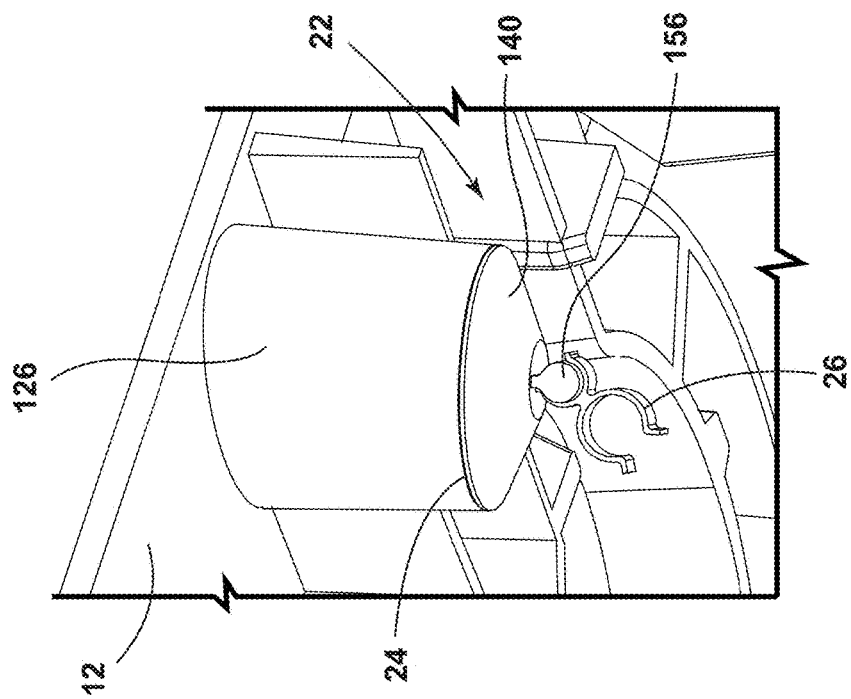
FIG. 8B is an enlarged partial side perspective view of the retention assembly of FIG. 8A and the peg of the windshield bracket.
Figure 8A:
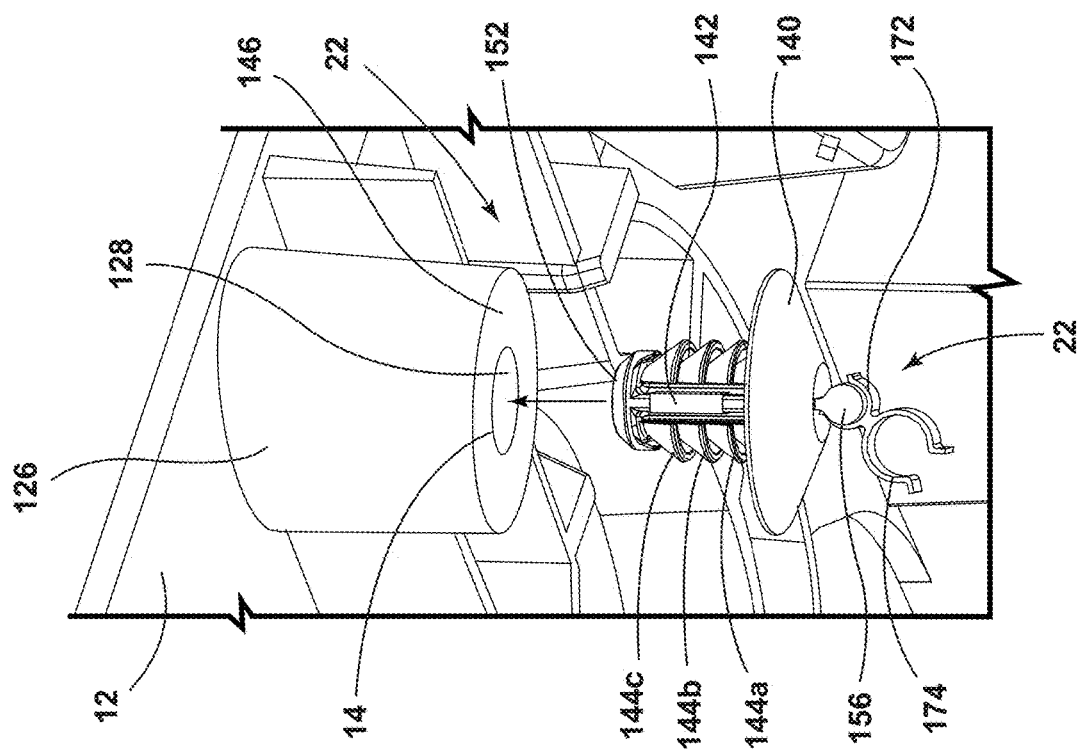
FIG. 8A is an enlarged partial exploded side perspective view of a retention assembly of the present disclosure and a peg of a windshield bracket.
Figure 9:
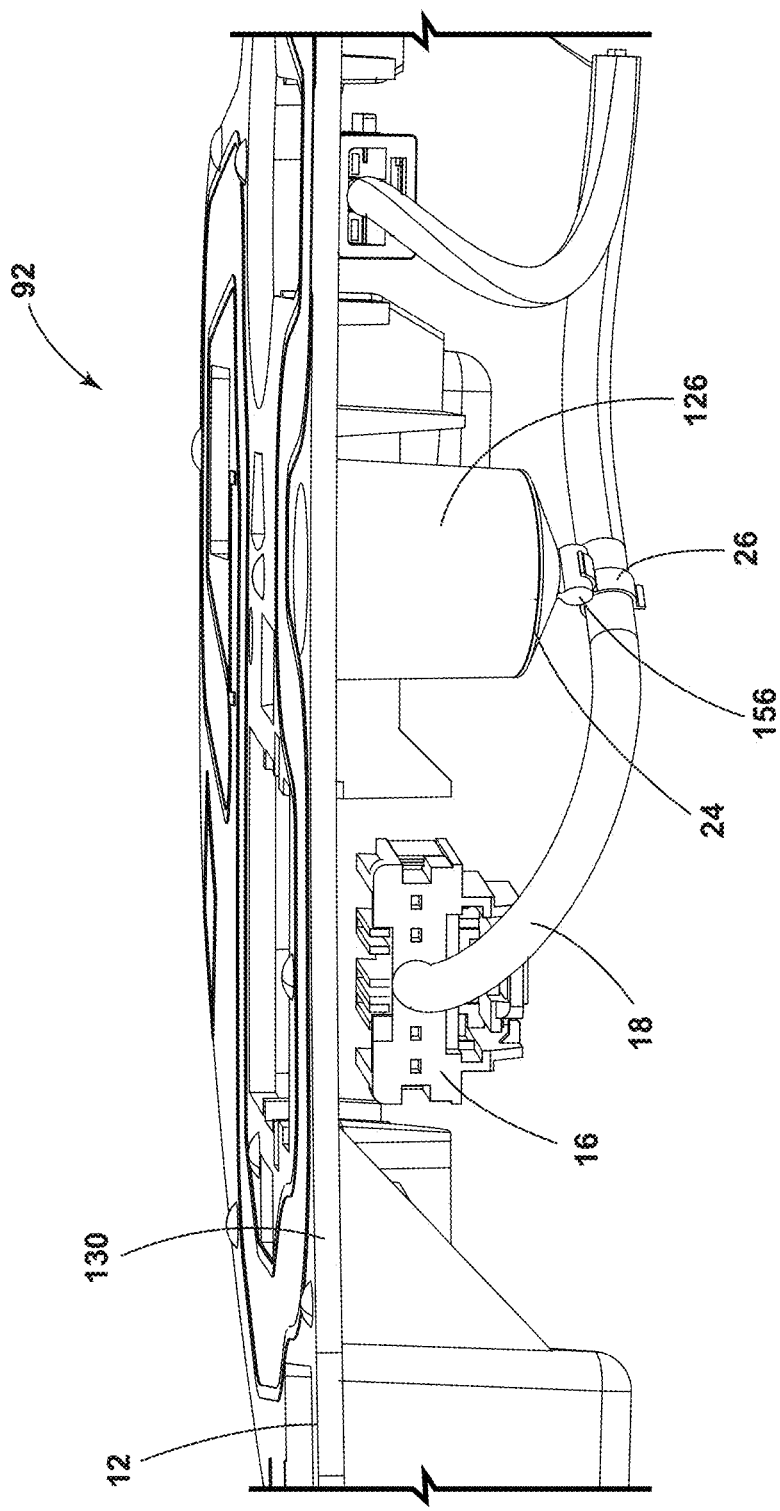
FIG. 9 is a partial side elevational view of a windshield bracket and a retention assembly of the present disclosure.
Figure 10:
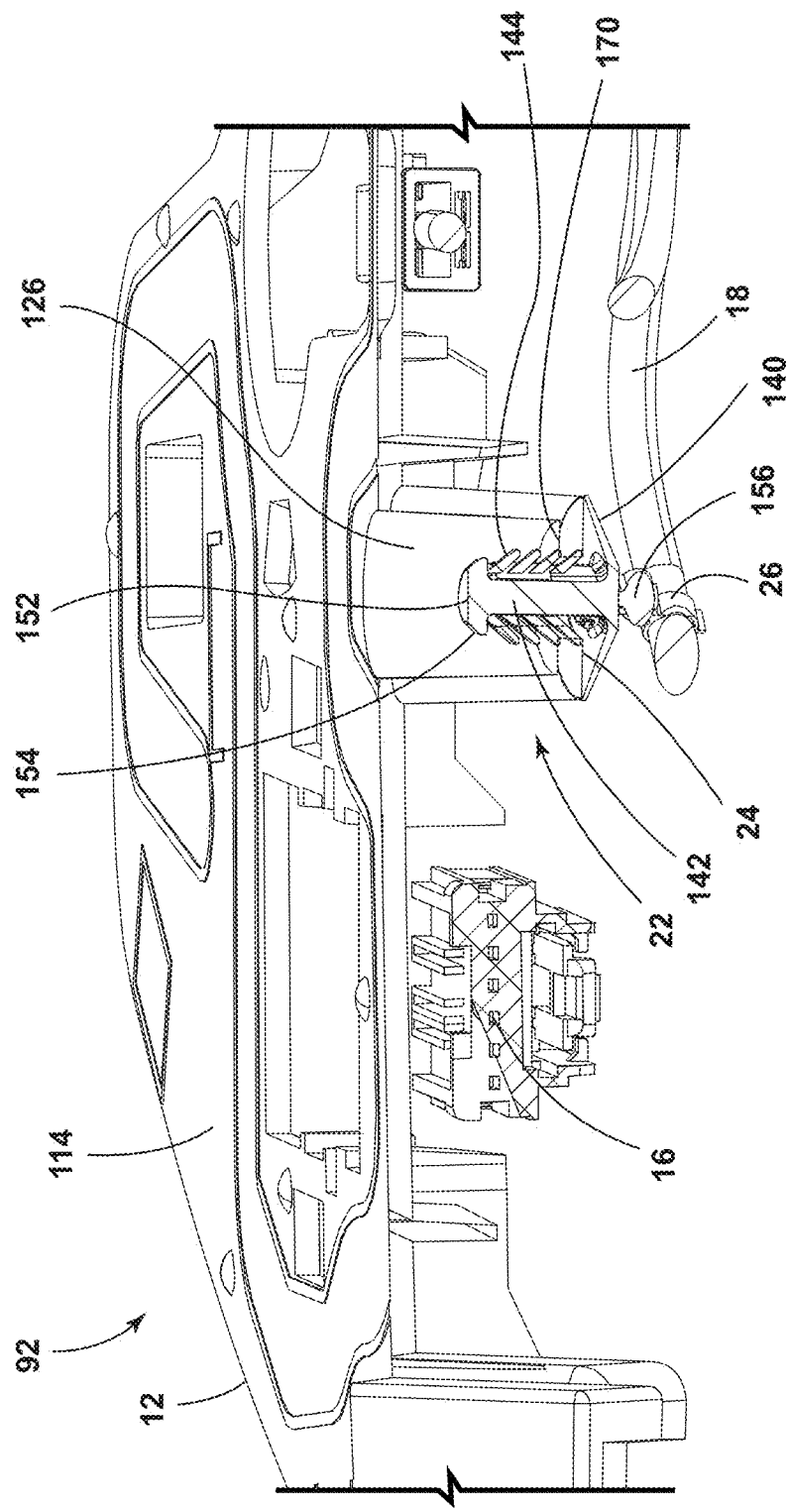
FIG. 10 is a partial cross-sectional view of the windshield bracket and the retention assembly of FIG. 9.

The shaft 142 of the fastening feature 24 extends from the cover portion 140, and the radial fins 144 extend outwardly and upwardly from the shaft 142. It is generally contemplated that at least two of the radial fins 144 are overlapping, such that a first end 148 of one fin 144 may conceal a second end 150 of an adjacent fin 144. The fins 144 are illustrated as tapering from the first end 148 to the second end 150. The illustrated fins 144 circumferentially or radially extend from the shaft 142, such that each fin 144 generally wraps around the shaft 142. Additionally or alternatively, the fins 144 may be flanges, projections, protrusion, and/or other projections practicable to extend outwardly from the shaft 142. The fins 144, regardless of shape or configuration, are generally tapered and/or angled, so each fin 144 is overlapped by the adjacent fin 144. As illustrated in FIG. 7, the plurality of radial fins 144 includes first, second, and third fins 144a, 144b, 144c. The first end 148 of the third fin 144c overlaps the second end 150 of the central fin 144b, and the first end 148 of the central fin 144b overlaps the second end 150 of the first fin 144a. It is generally contemplated that the fins 144 may extend around the entire circumference of the shaft 142. Additionally or alternatively, the fins 144 may radially extend from the shaft 142, such that the fins 144 extend from a portion of the shaft 142.

With further reference to FIGS. 6-8B, the second end 150 of the third fin 144c is proximate to an end 152 of the shaft 142, which includes peripheral flanges 154 extending upwardly from the end 152. As illustrated in FIG. 8A, the end 152 of the fastening feature 24 is inserted into the aperture 14 defined by the peg 126. It is generally contemplated that the peripheral flanges 154 and/or the radial fins 144 may engage the peg 126 proximate to the aperture 14, described further below. The fastening feature 24 also includes an attachment feature 156, which is operably coupled to the cover portion 140 of the fastening feature 24. The attachment feature 156 is illustrated as an elongated member extending outwardly from the cover portion 140. The attachment feature 156 may include a base flange 158 that couples to a planar portion 160 of the cover portion 140, such that the attachment feature 156 and the cover portion 140 define a space between the planar portion 160 and the base flange 158. As described further below, the coupling member 26 is operably coupled to the fastening feature 24 via the attachment feature 156.

Referring to FIGS. 7-10, the radial fins 144 may engage the peg 126 as the fastening feature 24 translates into the aperture 14. The fins 144 may be compressed as each fin 144 passes through the aperture 14, and the fins 144 may expand once each fin 144 enters the cavity 128. This compression and expansion of the fins 144 assists in inserting the fastening feature 24 into the peg 126, while ensuring the fastening feature 24 can be retained within the peg 126. The general tapered configuration of the radial fins 144 advantageously assists the retention of the fastening feature 24 within the aperture 14 of the peg 126. For example, the first end 148 of each fin 144 is configured to engage an inner surface 170 of the peg 126 when the fastening feature 24 is disposed within the peg 126. Stated differently, the first end 148 of each of the fins 144 is generally configured to retain the fastening feature 24 within the peg 126. It is also contemplated that the peripheral flange 154 of the end 152 of the shaft 142 may alternatively retain the fastening feature 24 within the peg 126. For example, if the fastening feature 24 is not fully positioned within the peg 126, then the peripheral flanges 154 can engage the inner surface 170 of the peg 126 to retain the fastening feature 24.

With further reference to FIGS. 7-10, the coupling member 26 is operably coupled to the attachment feature 156 of the cover portion 140 of the fastening feature 24. The coupling member 26 includes a first clip 172 and a second clip 174. It is generally contemplated that the first clip 172 may be smaller than the second clip 174, and the first clip 172 is operably coupled to the fastening feature 24. Stated differently, the second clip 174 can have a circumference $C_1$ that is greater than a circumference $C_2$ of the first clip 172. Additionally or alternatively, the circumference $C_2$ of the first clip 172 may be greater and/or equal to the circumference $C_1$ of the second clip 174. Each of the first and second clips 172, 174 may have a generally C-shaped configuration, such that each of the first and second clips 172, 174 includes a first prong 176 and a second prong 178. The first and second prongs 176, 178 may be integrally formed with a body 180 of each of the first and second clips 172, 174. It is generally contemplated that the body 180 of each of the first and second clips 172, 174 may be flexibly resilient, such that the first prong 176 and the second prong 178 may be translated apart while flexing the body 180.

For example, the body 180 of the first clip 172 may be positioned around the attachment feature 156 of the fastening feature 24, such that the first prong 176 can be bent or otherwise translated away from the second prong 178. Once the first and second prongs 176, 178 are separated, the body 180 of the first clip 172 can be disposed around the attachment feature 156. Typically, the first and second prongs 176, 178 may be separated by applying a force to one or both of the first and second prongs 176, 178. As the force is applied to the first and second prongs 176, 178, the body 180 can flex to generally expand the circumference $C_2$ of the first clip 172. The body 180 of the first clip 172 may resiliently reform to the original circumference $C_2$ of the first clip 172 when the force is removed from the first and second prongs 176, 178.

The first clip 172 is operably coupled to the second clip 174 via a bar 182. It is also contemplated that the first and second clips 172, 174 may be integrally formed with the bar 182 to define the coupling member 26. The bar 182 is illustrated as a flat body extending between the first and second clips 172, 174. Additionally or alternatively, the bar 182 may be cylindrical, rectangular, square, triangular, and/or any other shape generally known in the art. The second clip 174 outwardly extends from the bar 182 at an opposing end relative to the first clip 172. As mentioned above, the second clip 174 generally has a larger circumference $C_1$ as compared to the first clip 172. As such, the second clip 174 may be configured to receive a larger item as compared to the first clip 172.

The second clip 174 is generally configured to receive at least one of the wires 18 disposed along the windshield bracket 12. It is also contemplated that the second clip 174 may receive a plurality of wires 18, such that multiple wires 18 can be retained by the second clip 174. Stated differently, the second clip 174 receives and retains the wires 18 of the electrical components 16, while the first clip 172 is operably coupled to and generally receives the attachment feature 156 of the fastening feature 24. The bar 182 maintains a uniform axis X through a central portion of each of the first and second clips 172, 174. The coupling member 26 is configured to generally rotate about the attachment feature 156 of the fastening feature 24. Accordingly, the coupling member 26 can be adjustably positioned relative to the fastening feature 24 to accommodate the various positioning of the wires 18 along the windshield bracket 12.

With further reference to FIGS. 7-10, the radial fins 144 cooperate with the coupling member 26 to retain the wires 18 along the windshield bracket 12. As the wires 18 may be repositioned and/or adjusted during assembly of the windshield 80 and the windshield bracket 12, the retention assembly 22 may be articulated, rotated, and/or pulled. The fins 144 of the fastening feature 24 can engage the inner surface 170 of the peg 126 to retain the fastening feature 24 within the peg 126, and the fastening feature 24 can rotate within the aperture 14, depending on the articulation of the wires 18. Additionally or alternatively, the coupling member 26 may laterally rotate about the attachment feature 156 while the wires 18 are repositioned. The cooperation between the fastening feature 24 and the coupling member 26 assist in proper placement of the wires 18 along the windshield bracket 12.

Referring again to FIGS. 1-10, the retention assembly 22 assists in the general arrangement of the windshield bracket 12 by providing a variety of potential arrangements of the electrical components 16. The retention assembly 22 can rotate within and relative to the windshield bracket 12 to accommodate various potential positions of the wires 18. The coupling member 26 assists in retaining the wires 18 in a determined position, while the fastening feature 24 is configured to engage the inner surface 170 of the peg 126 to retain the retention assembly 22 and the wires 18 in the determined position. The fastening features 24 can be rotated within the peg 126 to position the coupling member 26 in the desired position, and the coupling member 26 can be rotated about the attachment feature 156 to position the wire 18 in the desired position relative to the windshield bracket 12. Thus, the manufacturer can advantageously adjust and retain the wires 18 along the windshield bracket 12 in a variety of positions by circumferentially rotating the fastening feature 24 and/or laterally rotating the coupling member 26.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle, comprising:
   a windshield bracket defining an aperture;
   electrical components operably coupled to the windshield bracket, the electrical components including wires extending from each electrical component;
   a rearview mirror proximate to the windshield bracket and operably coupled to the electrical components via the wires; and
   a retention assembly operably coupled to the windshield bracket and at least one of the wires of the electrical components, the retention assembly including a fastening feature disposed within the aperture defined by the windshield bracket and a coupling member rotatably coupled to the fastening feature, wherein the fastening feature includes a shaft and a plurality of radial fins.

2. The vehicle of claim 1, wherein the plurality of radial fins operably couple the shaft of the fastening feature to the windshield bracket.

3. The vehicle of claim 1, wherein the fastening feature includes an attachment feature, and wherein the coupling member is operably and rotatably coupled to the attachment feature.

4. A vehicle, comprising:
   a windshield bracket defining an aperture;
   electrical components operably coupled to the windshield bracket, the electrical components including wires extending from each electrical component;
   a rearview mirror proximate to the windshield bracket and operably coupled to the electrical components via the wires; and
   a retention assembly operably coupled to the windshield bracket and at least one of the wires of the electrical components, the retention assembly including a fastening feature disposed within the aperture defined by the windshield bracket and a coupling member rotatably coupled to the fastening feature, wherein the coupling member includes a first clip and a second clip.

5. The vehicle of claim 4, wherein the first clip is operably coupled to the fastening feature and the second clip is operably coupled to at least one of the wires of the electrical components.

6. A vehicles, comprising
   a windshield bracket defining an aperture;
   electrical components operably coupled to the windshield bracket, the electrical components including wires extending from each electrical component;
   a rearview mirror proximate to the windshield bracket and operably coupled to the electrical components via the wires; and
   a retention assembly operably coupled to the windshield bracket and at least one of the wires of the electrical components, the retention assembly including a fastening feature disposed within the aperture defined by the windshield bracket and a coupling member rotatably coupled to the fastening feature, wherein the fastening feature includes a cover portion disposed over the aperture defined by the windshield bracket, and wherein the cover portion extends circumferentially from a shaft of the fastening feature.

7. A windshield bracket assembly for a vehicle, comprising:
   a windshield bracket defining an aperture;
   electrical components operably coupled to the windshield bracket and including a wire;
   a rearview mirror proximate to the windshield bracket and operably coupled to the electrical components via the wire; and
   a retention assembly disposed within the aperture of the windshield bracket and operably coupled to the wire of the electrical components, wherein the coupling member is selectively coupled to the wire and is configured to retain the wire relative to the rearview mirror, and wherein the retention assembly includes a fastening feature and a coupling member.

8. The windshield bracket assembly of claim 7, wherein the wire is disposed within the coupling member, and wherein the coupling member is rotatably coupled to the fastening feature and is configured to rotate relative to the positioning of the wire.

9. The windshield bracket assembly of claim 7, wherein the retention assembly includes a shaft disposed within the aperture of the windshield bracket to operably couple the retention assembly to the windshield bracket.

10. The windshield bracket assembly of claim 9, wherein the shaft includes a plurality of radial fins configured to engage an inner surface of the aperture.

11. The windshield bracket assembly of claim 7, wherein the coupling member includes a first clip and a second clip, and wherein the wire of the electrical component is selectively coupled to the second clip.

12. The windshield bracket assembly of claim 11, wherein the first clip is rotatably coupled to the fastening feature.

13. A retention assembly for a windshield bracket, comprising:

a fastening feature including a shaft defining a plurality of radial fins along a length of the shaft;

a cover portion operably coupled to the shaft of the fastening feature and including an attachment feature; and a coupling member including a first clip operably coupled to the attachment feature of the cover portion and a second clip configured to receive a wire of said windshield bracket.

14. The retention assembly of claim 13, wherein the second clip has a circumference that is greater than a circumference of the first clip.

15. The retention assembly of claim 13, wherein the cover portion extends circumferentially around the shaft.

16. The retention assembly of claim 13, wherein each radial fin of the plurality of radial fins has a first end and a second end.

17. The retention assembly of claim 16, wherein each radial fin tapers from the first end to the second end.

* * * * *